(12) United States Patent
Tedesco et al.

(10) Patent No.: US 8,296,315 B2
(45) Date of Patent: Oct. 23, 2012

(54) EARMARKING MEDIA DOCUMENTS

(75) Inventors: Megan Lesley Tedesco, Sammamish, WA (US); Matthew Jubelirer, Seattle, WA (US); Thamer A. Abanami, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 28 days.

(21) Appl. No.: 11/556,478

(22) Filed: Nov. 3, 2006

(65) Prior Publication Data

US 2008/0109405 A1    May 8, 2008

(51) Int. Cl.
*G06F 7/00* (2006.01)
*G06F 17/30* (2006.01)
*G06F 3/00* (2006.01)
*G06F 13/00* (2006.01)
*H04N 5/445* (2011.01)

(52) U.S. Cl. ............... 707/769; 725/40; 725/50; 725/51; 725/53

(58) Field of Classification Search ............... 707/104.1, 707/769, E17.108; 725/40, 50, 51, 53
See application file for complete search history.

(56) References Cited

U.S. PATENT DOCUMENTS

| | | | |
|---|---|---|---|
| 5,920,694 A | 7/1999 | Carleton et al. | |
| 6,463,444 B1 * | 10/2002 | Jain et al. | 1/1 |
| 6,551,357 B1 | 4/2003 | Madduri | |
| 6,567,980 B1 * | 5/2003 | Jain et al. | 725/61 |
| 6,578,047 B1 * | 6/2003 | Deguchi | 1/1 |
| 6,801,576 B1 | 10/2004 | Haldeman et al. | |
| 6,877,134 B1 * | 4/2005 | Fuller et al. | 715/202 |
| 6,925,197 B2 * | 8/2005 | Dimitrova et al. | 382/118 |
| 6,956,593 B1 | 10/2005 | Gupta et al. | |
| 6,957,226 B2 | 10/2005 | Attias | |
| 7,093,191 B1 * | 8/2006 | Jain et al. | 715/201 |
| 7,127,454 B2 * | 10/2006 | Deguchi | 1/1 |
| 7,158,943 B2 | 1/2007 | van der Riet | |
| 7,190,971 B1 * | 3/2007 | Kawamoto | 455/556.1 |
| 7,210,039 B2 | 4/2007 | Rodgers et al. | |
| 7,260,564 B1 * | 8/2007 | Lynn et al. | 1/1 |

(Continued)

FOREIGN PATENT DOCUMENTS

JP    2003076704 A  *  3/2003

(Continued)

OTHER PUBLICATIONS

"Final Office Action", U.S. Appl. No. 11/674,894, (May 12, 2011), 13 pages.

(Continued)

*Primary Examiner* — Vincent Boccio
*Assistant Examiner* — Griselle Corbo
(74) *Attorney, Agent, or Firm* — Wolfe-SBMC

(57) ABSTRACT

A media object being played by a user may be marked by creating a mark object comprising the playback time when the mark was created. The time may be used to reference metadata with information about the media object at the time referenced. The metadata may be used to launch web searches corresponding to elements of the media at the time in question, for example, a back up singer at a point in a music track or the name of a resort in a movie. The searches may be performed from media player or the mark object may be transferred to a networked computer for performing the searches. The technique is equally applicable to portable media players, software or firmware media players on computers, or set top boxes.

17 Claims, 6 Drawing Sheets

U.S. PATENT DOCUMENTS

| | | | |
|---|---|---|---|
| 7,295,752 B1* | 11/2007 | Jain et al. | 386/285 |
| 7,454,401 B2* | 11/2008 | Yamamoto et al. | 1/1 |
| 7,490,107 B2* | 2/2009 | Kashino et al. | 1/1 |
| 7,505,605 B2* | 3/2009 | Rhoads et al. | 382/100 |
| 7,636,733 B1* | 12/2009 | Rothmuller | 382/305 |
| 7,680,781 B1 | 3/2010 | Wasserman et al. | |
| 7,801,910 B2* | 9/2010 | Houh et al. | 707/765 |
| RE41,957 E* | 11/2010 | Deguchi et al. | 1/1 |
| 7,848,948 B2* | 12/2010 | Perkowski et al. | 705/14.4 |
| 7,890,490 B1* | 2/2011 | Bovenschulte et al. | 707/708 |
| 2001/0018693 A1* | 8/2001 | Jain et al. | 707/500 |
| 2001/0023436 A1 | 9/2001 | Srinivasan et al. | |
| 2002/0023020 A1 | 2/2002 | Kenyon et al. | |
| 2002/0069218 A1* | 6/2002 | Sull et al. | 707/501.1 |
| 2003/0028432 A1 | 2/2003 | Troyansky et al. | |
| 2003/0149975 A1 | 8/2003 | Eldering et al. | |
| 2003/0177503 A1* | 9/2003 | Sull et al. | 725/112 |
| 2004/0002938 A1* | 1/2004 | Deguchi | 707/1 |
| 2004/0019521 A1 | 1/2004 | Birmingham | |
| 2004/0059720 A1 | 3/2004 | Rodriguez | |
| 2004/0093393 A1 | 5/2004 | Calligaro et al. | |
| 2004/0133786 A1* | 7/2004 | Tarbouriech | 713/185 |
| 2004/0139047 A1 | 7/2004 | Rechsteiner et al. | |
| 2004/0177096 A1* | 9/2004 | Eyal et al. | 707/104.1 |
| 2004/0236830 A1 | 11/2004 | Nelson et al. | |
| 2005/0010787 A1* | 1/2005 | Tarbouriech | 713/185 |
| 2005/0055277 A1 | 3/2005 | Green et al. | |
| 2005/0065853 A1 | 3/2005 | Ferreira | |
| 2005/0091268 A1* | 4/2005 | Meyer et al. | 707/103 R |
| 2005/0113066 A1 | 5/2005 | Hamberg | |
| 2005/0204398 A1* | 9/2005 | Ryal | 725/112 |
| 2005/0229227 A1 | 10/2005 | Rogers | |
| 2005/0234875 A1* | 10/2005 | Auerbach et al. | 707/3 |
| 2006/0069998 A1 | 3/2006 | Artman et al. | |
| 2006/0072785 A1 | 4/2006 | Davidson et al. | |
| 2006/0085825 A1 | 4/2006 | Istvan et al. | |
| 2006/0089843 A1 | 4/2006 | Flather | |
| 2006/0173825 A1* | 8/2006 | Hess et al. | 707/3 |
| 2006/0242161 A1* | 10/2006 | Ten Kate et al. | 707/100 |
| 2006/0259375 A1* | 11/2006 | Deguchi | 705/27 |
| 2007/0005581 A1* | 1/2007 | Arrouye et al. | 707/4 |
| 2007/0106693 A1* | 5/2007 | Houh et al. | 707/104.1 |
| 2007/0112837 A1* | 5/2007 | Houh et al. | 707/102 |
| 2007/0149114 A1* | 6/2007 | Danilenko | 455/3.06 |
| 2007/0168315 A1* | 7/2007 | Covannon et al. | 707/1 |
| 2007/0273754 A1* | 11/2007 | Cockerton et al. | 348/14.08 |
| 2008/0092168 A1* | 4/2008 | Logan et al. | 725/44 |
| 2008/0195660 A1 | 8/2008 | Tedesco et al. | |

FOREIGN PATENT DOCUMENTS

| | | |
|---|---|---|
| WO | WO-2006012629 | 2/2006 |
| WO | WO-2006077536 | 7/2006 |

OTHER PUBLICATIONS

"Non-Final Office Action", U.S. Appl. No. 11/674,894, (Aug. 23, 2011), 11 pages.

"Non-Final Office Action", U.S. Appl. No. 11/674,894, (Sep. 1, 2010), 11 pages.

Erdogan, Engin "An On-Demand Advertising Model for Interactive Television", *Masters Project, Information Design and Technology, Georgia Institute of Technology*, Available at <http://lcc.gatech.edu/ms_projects/eerdogan/enginerdogan_masters_designdoc.pdf>,(Apr. 2004), pp. 1-35.

Jain, Ramesh et al., "Metadata in Video Databases", *Sigmod Record*, vol. 23, No. 4, retrieved from <http://delivery.acm.org/10.1145/200000/190638/p27-jain.pdf?key1=190638&key2=5655452611&coil=GUIDE&dl=GUIDE&CFID=3701082&CFTOKEN=27063820>, (Dec. 1994), pp. 27-33.

Moser, H. R., et al., "Product Placement as A Marketing Tool in Film and Television", *National Social Science Journal*, 22 (1), 76-86, retrieved from <http://www.nssa.us/nssajrnl/22-1/pdf/12/pdf>,(2004), 11 pages.

Wiles, Michael A., et al., "The Impact of Film Product Placement on Firm Market Values", *Kelley School of Business, Indiana University*, Bloomington, IN, retrieved from <http://www.kelley.iu.edu/marketing/wiles_jm_11_11_05.pdf,(Nov. 11, 2005), 37 pages.

Dowman et al., "Web-Assisted Annotation, Semantic Indexing and Search of Television and Radio News," WWW 2005, http://gate.ac.uk/sale/www05/web-assisted-annotation.pdf#search=%22annotation%20in%20media%20files%2Bpdf%22.

Schroeter et al., "A Collaborative Video Indexing, Annotation and Discussion System for Broadband Networks," http://metadath.net/filmed/pub/Vannotea.pdf#search=%22annotation%20in%20media%20files%2Bpdf%22, 2003.

Vernbu at al., "Towards Bridging the Semantic Gap in Multimedia Annotation and Retrieval," http://image.ntua.gr/swamm2006/resources/paper18.pdf#search=%22annetation%20of%20media%20files%2Bpdf%22.

"Final Office Action", U.S. Appl. No. 11/674,894, (Mar. 23, 2012), 16 pages.

\* cited by examiner

EARMARKING MEDIA DOCUMENTS

BACKGROUND

Media players are in common use among a broad base of users. Radio and television have provided entertainment for generations of users. Portable transistor radios of the 1960s began a trend to smaller and more robust personal media players including very small players storing all digital content on both rotating and non-rotating media. Streaming media is available over both wireless and wired networks and may be displayed on cellular telephones and other portable media devices.

Information about the media being played is often available in the form of a 'now playing' identifier or a radio station genre. Often, however, a listener or viewer is interested in more information than simply what is playing. A listener may wonder what kind of instrument is playing at a given moment or the name of a back up singer. A media viewer may have similar questions related to a location or props in a particular scene.

SUMMARY

A media player may be operable to accept a user input indicating interest in a media object at a particular point in the time during playback time of the media object. The 'earmark' may then be used to search for available information about the media object. The media object itself may contain metadata organized by time for use in supplying data. Alternatively, the metadata may provide keywords or phrases used to populate a search for related information. In another embodiment, the metadata may contain one or more URLs for directly accessing related information. The search may be made from the media player or may be performed at a computer using information sent by the media player. When searching from a computer, the search criteria, as little as a reference to the media object with a time, or as complete as URLs, may be transferred to a computer explicitly for the purpose of searching or may be transferred during a normal synchronizing operation.

The media player may be a handheld device, a virtual player on a computer, a set-top box, a cellular telephone, or other device capable of supporting media objects, a user interface, and in many cases, external communication.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
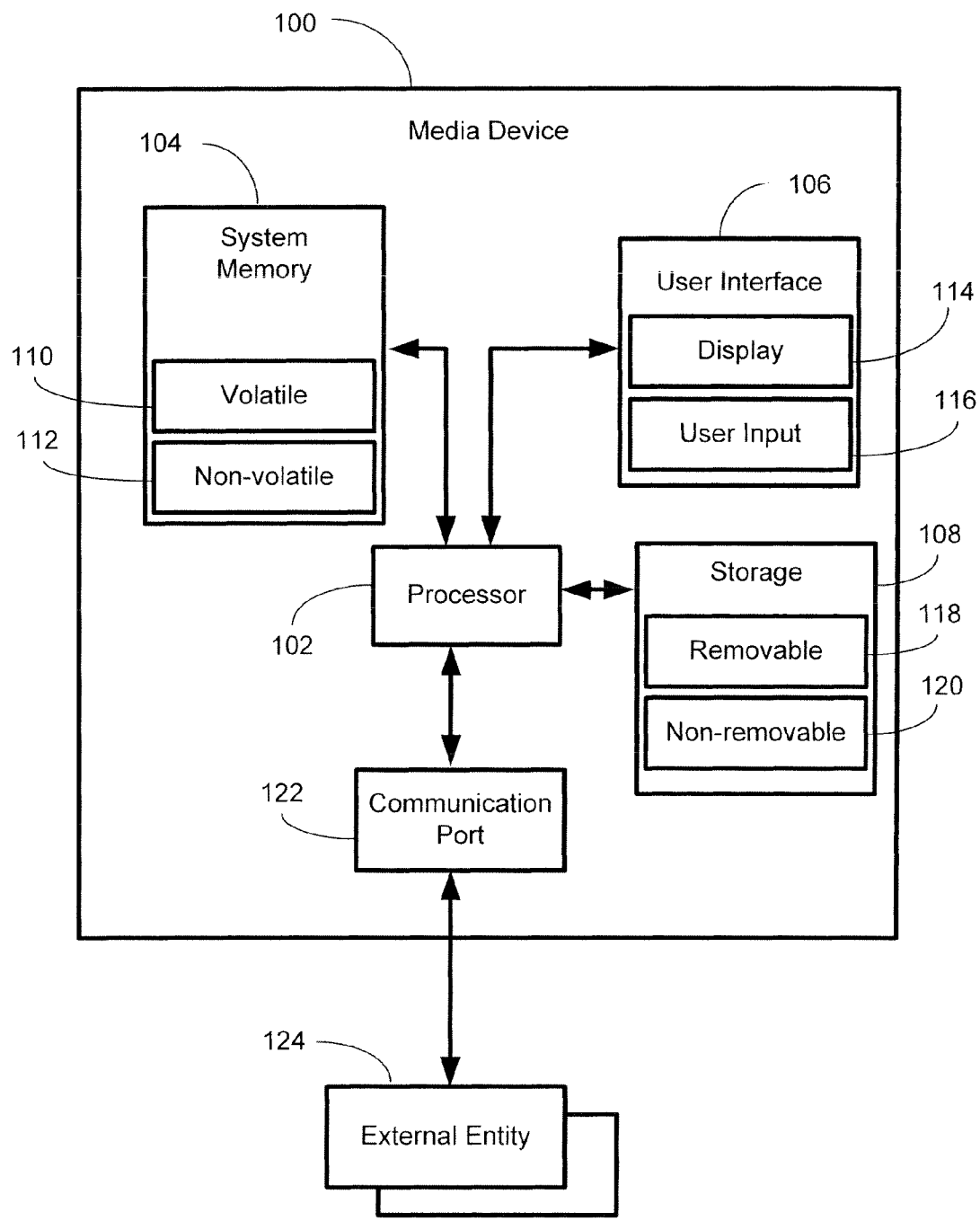
FIG. 1 is an illustration of hardware for a portable media device.

FIG. 1 is an illustration of exemplary hardware that may be used for a media device 100. The media device 100 may have a processing unit 102, a memory 104, a user interface 106, a storage device 108 and a power source (not shown). The memory 104 may include volatile memory 110 (such as RAM), non-volatile memory 112 (such as ROM, flash memory, etc.) or some combination of the two.

The media device 100 may also include additional storage 108 (removable and/or non-removable) including, but not limited to, magnetic or optical disks or tape or any other memory that can be easily rewritten, may keep data for long periods of time when power is removed and may allow quick and efficient access to data. Such additional storage is illustrated in FIG. 1 by removable storage 118 and non-removable storage 120. Computer storage media includes volatile and nonvolatile, removable and non-removable media implemented in any method or technology for storage of information such as computer readable instructions, data structures, program modules, digital media, or other data. Memory 104, removable storage 118, and non-removable storage 120 are all examples of computer storage media. Computer storage media includes, but is not limited to, RAM, ROM, EEPROM, flash memory or other memory technology. Any such computer storage media may be part of device 100.

The processing unit 102 may be any processing unit 102 capable of executing computer code to decode media data from a compressed format into a useable form fast enough such that music and video may be played continuously without skips or jumps. When in a portable media device, it may also be useful if the processor 102 is efficient in using power to increase the life of the power source. The processing unit 102 may also be used to execute code to support a user interface and external communications.

The user interface may include one or more displays 114 for both displaying control information and displaying viewable media. The display 114 may be a color LCD screen that fits inside the device 100. User input(s) 116 may include either manual buttons, soft buttons, or a combination of both. Soft buttons may be used when the display 114 includes a touch screen capability. Manual buttons may include re-definable keys with programmable legends.

The media device 100 may also contain communications connection(s) 122 that allow the device 100 to communicate with external entities 124, such as network endpoints or a computer used for synchronization. Communications connection(s) 122 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The power source may be a battery that may be rechargeable. The power source may also be a standard battery or an input from a power converter.

In operation, a user may activate playback of a media object using the user interface to select and play. At any point during the playback, the user may create a mark object using the user interface, for example, a soft key available only during playback. Creating the mark object may initiate activity by the processor 102 to execute a search for references. The search may be based on a combination of the media object and the playback time associated with the creation of the mark object. As described in more detail below, the results of the initial search may be used to launch a second search for information associated with the references discovered in the initial search. In one embodiment, metadata from the media object may be used as a seed for a single search. While any number of combinations of search may be used, in one exemplary embodiment, the initial search may be performed on the media device to locate metadata associated with the media object and the particular playback time. The second search may involve communication of the metadata over the communication port 122 with the external entity 124 to either directly or indirectly perform a search, such as a web search, using the metadata as a search key. Other combinations of search and data retrieval are discussed in more detail below.

Figure 2:
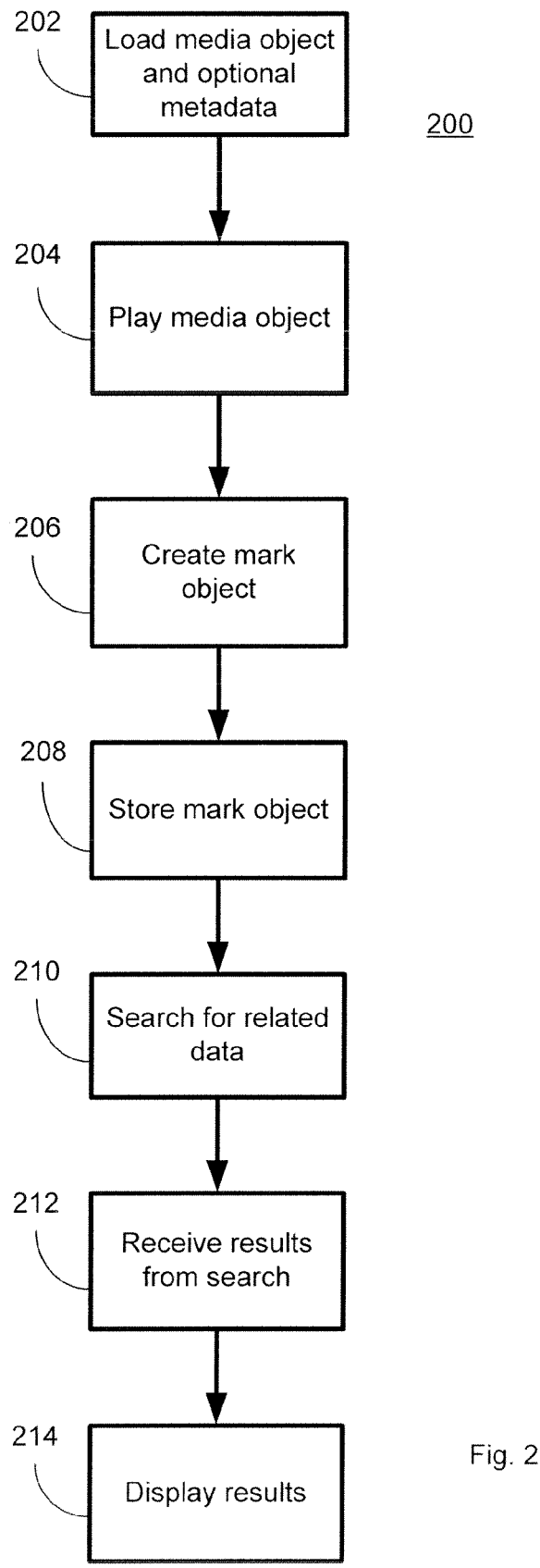
FIG. 2 is a flow chart of a method of creating and using an earmark for a media document.

FIG. 2, a flow chart of a method 200 of creating and using an earmark for a media object, is discussed and described. At block 202, a media object may be loaded onto a media device, such as a media device 100 of FIG. 1, capable of playing MP3 audio, MPEG video, streaming video or the like. The media object may be music, video, audio programming or any data played back using a time-based format. Optionally, metadata corresponding to the media object may also be loaded onto the media device. The metadata may be incorporated in the media object or may be a separate file associated with the media object.

At block 204 the media object may be played using the user interface, or played automatically by a programmable activation trigger. During playback of the media object, at block 206, creation of a mark object may be initiated by a user via a user interface element, such as a soft key. The mark object may be persistent, that is, permanently stored, or may be transitory, stored only in local volatile memory. The complexity of the mark object may vary substantially over different embodiments based on where and how much metadata or reference information is immediately available. In one embodiment, only a media object identifier and a time indicator may be used as the mark object. In such an embodiment, virtually all the metadata or reference information may be gathered from sources outside the media object itself, either locally or remotely. In another exemplary embodiment, when the media object contains its own metadata, creation of the mark object may include extracting metadata from the media object so that the mark object itself may include metadata corresponding to the media object.

The metadata may be more or less specific to a given time. That is, some metadata may be appropriate to all times of the playback, such as producer or director. Other metadata may be specific to a very narrow time range, for example, a five second scene of a car driving through a city street.

The metadata itself may vary substantially based on a particular embodiment. The metadata may have specific search keys used to initiate a web search. Search key metadata or direct URL metadata may provide links or search keys for any kind of data, but may be particularly useful for information that may change over time, such as actor filmography or the name of a store. Alternatively, the metadata may have pre-determined information about the time range of the media in question, such as artists, instruments, actors, locations, etc. Such information may be anticipated as likely to be requested and is also relatively stable. Metadata that is complete of itself may be directly displayable on the media device itself without use of a network.—For example, the metadata may include an actor's name, a product identifier or brand name, or a geographic location (e.g. Central Park). In such a case, that search key data may be passed to a common data search engine. In another embodiment, the metadata may include a universal resource locator (URL) and may represent a web destination of its own, for example, a specific product page in a company's on-line store. In another embodiment, the metadata may include a combination or key words and URLs. To illustrate a range of embodiments, minute 1:00-1:05 of an MP3 audio track may be associated with URL metadata that points to a record label's web site. Upon reaching the web site, a list of musicians and their instruments playing during that time period of the audio track may be listed. Additionally, the record label web site may include a "listeners who liked this also enjoyed . . . " to help promote related items. To illustrate a more complex embodiment, at minute 22:00 of a movie, an actor in business attire may leave a subway station and walk into a hotel. Associated metadata may include the actor's name, the brand name of the suit, and a URL pointing to the hotel's web site. A combination of web search and navigation to a web destination may be incorporated into the data session based on the metadata. In another exemplary embodiment, the metadata may include a schema with all the artists who perform on a track listed by identifier along with references by artist identifier by time period in the track. An inquiry regarding a guest vocalist may be answered without referring the query to a web search. However, additional information requests, for example, a request related to the guest vocalist may be queued using the data from the locally-generated answer.

To accommodate scenes or thematic music elements, the metadata may be organized by time range. Using the illustration above, the scene of the actor walking into the hotel may play from minute 20:05 to minute 23:30. Any mark object falling in that time range may cause an association to the same metadata. More relationships between mark objects and metadata are discussed with respect to FIGS. 3-6.

The time in a media object may be extracted according to the digital media itself. In one embodiment, the time may be cumulative from the start, while in another embodiment the time may be associated with an MPEG frame reference. In still another embodiment, the time may come from a presentation time stamp (PTS) in streaming video.

At block 208, the mark object may be stored. The mark object may be stored on the media device 100 in either volatile or non-volatile memory. The mark object may be used on the media device itself, for example, in a set-top box, game consoles, smart phones, cellular phones and the like. A nominal amount of storage and network access allow utilization both local and remote metadata searches. Alternatively, the mark object may be sent to another computer or device for further processing when the media device 100 has a relatively small amount of storage or does not have a suitable network connection. As discussed above, the mark object may include as little as a media identifier and time reference. The mark object may be supplemented with locally available metadata before being sent to another device to perform the search.

At block 210, a search for related data may be performed using the mark object or metadata retrieved using the mark object. In some embodiments, the metadata may include executable code for presenting a user with search options related to the media object. For example, the metadata may include HTML statements for presenting a user with search options such as whether to search using keywords from the metadata or to select from a list of destination URLs from the metadata. User options may also include allowing the user to view locally available metadata before launching an external search. The search or web inquiry may be performed from the media device 100 or an external computer, for example, a computer used in synchronizing the media device 100. The search may be performed while the media object is still playing, providing results while the media object plays or after the playback is complete. Delaying the display of results may be standard on a portable media player, if screen size, processing power, or battery life are an issue. At block 212, the results may be returned and at block 214, the results may be displayed. When the results are returned in a suitable form, they may be communicated to and stored on the media device 100, even though the search may have been performed at a network accessible computer. The results may be added to locally available media object metadata to save time if the same query is made at a later time. The use of image analysis or scene identifiers may be used instead of or in supplement to metadata-based query support. A cursor-oriented user interface may be used to indicate a location on the screen with a cursor click on a spot on the scene. The cursor click inherently marks a playback time. An examination of the scene may use image analysis at the point of the cursor mark to use edge analysis or other pattern recognition technique to identify the shape indicated. The shape may be used as a key for a local or remote search to retrevied additional information about shape Other combinations of metadata and search result sources are apparent to those of ordinary skill, including searches made on accessible devices in an ad-hoc network community.

Figure 3:
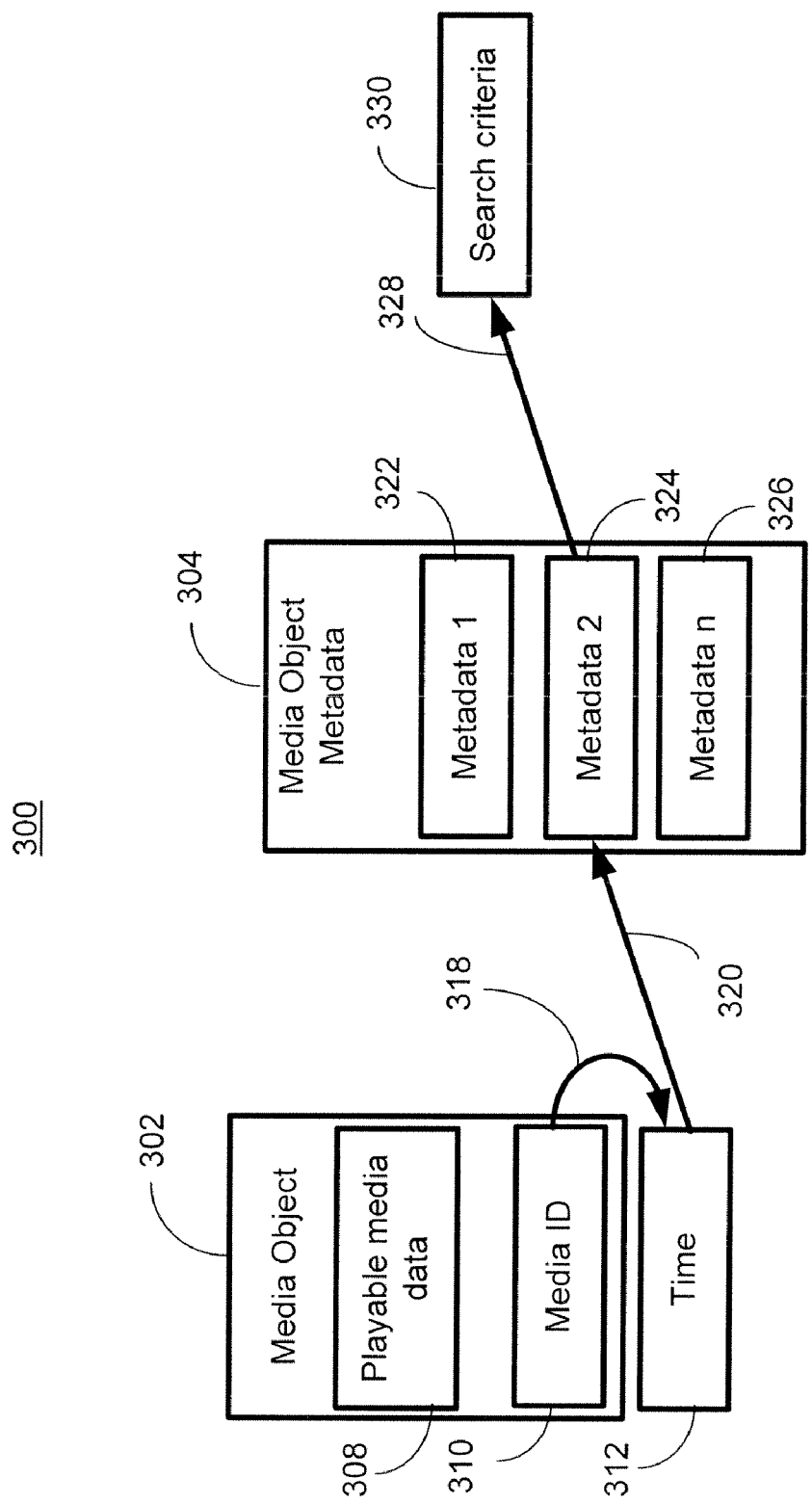
FIG. 3 is a block diagram of media object and media object metadata relationships.

FIG. 3-FIG. 6 illustrate a few of the many possible combinations of mark object capture and metadata association. FIG. 3 depicts a media object 302 and a separate file including media object metadata 304. The media object 302 may include playable media data 308, such as MP3 audio or MPEG video. The media object 302 may also include a media identifier 310. When a mark object is created, the media identifier 310 may be passed over logical link 318 and incorporated with a time reference 312, discussed above. The information may be stored and passed over link 320 and used in selecting appropriate time-specific media object metadata from the set of media object metadata items 322 324 326. In the illustration, the time 312 matches the second metadata 324. Using the second metadata 324, a search may be launched over link 328 using the search criteria extracted from the metadata, as described above.

Figure 4:
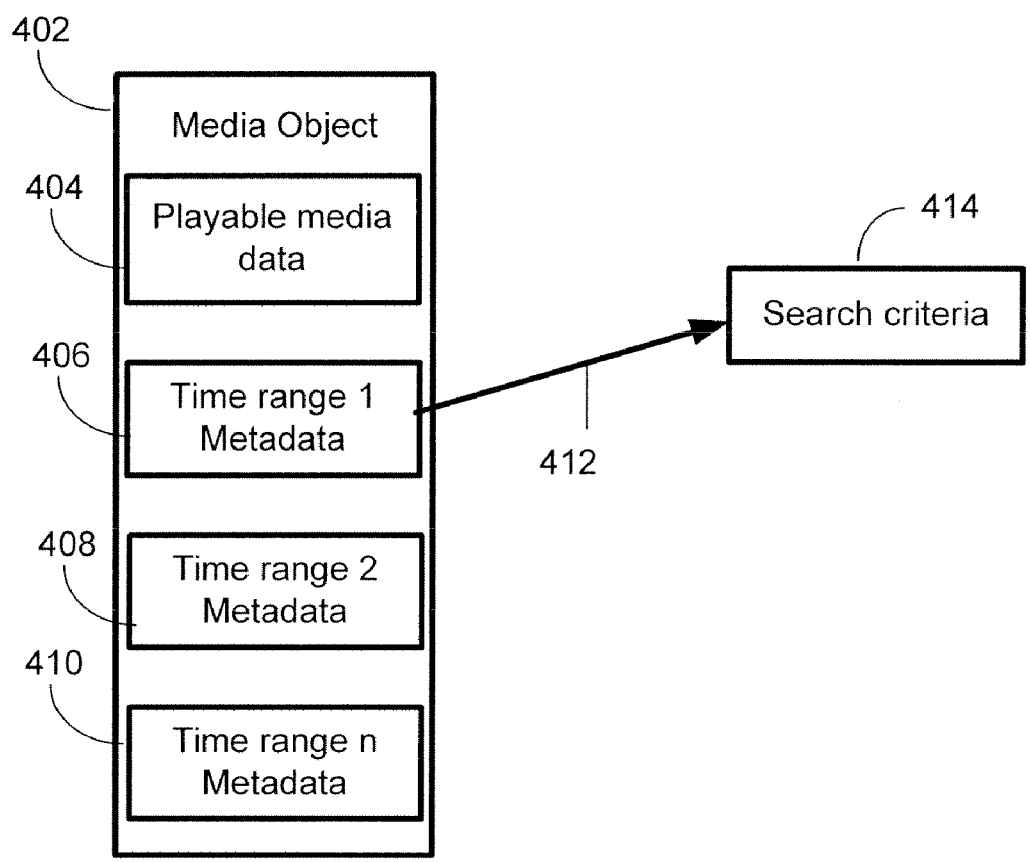
FIG. 4 is a block diagram of an alternate configuration of media object and media object metadata relationships.

FIG. 4 shows another instance of a media object 402 and playable media data 404. In this embodiment, the metadata is organized by time range as metadata 406 408 410 and stored in the media object file 402. Because the metadata is immediately accessible, link 412 may be used to launch a search directly using search criteria 414 extracted from the metadata 406. The metadata may include actionable items. For example, a movie scene in a department store may have metadata that, when accessed, displays a description of the scene and a list of actions that can be taken. When the viewer flags a scene and later reviews flagged items, an item for the movie may include a notation that includes the flag for that scene. The notation may include a list of actions that can be taken, such as shopping at the department store (a link and passed parameters, for example), a travel agency for a trip to that city, sporting event tickets, etc. Other actionable items may include health and beauty advice, financial services, family counseling, etc. depending on the scene and the context. Internally stored metadata, as here, and externally stored metadata of FIG. 3 each have advantages in terms of accessibility for one and ease of updates for the other.

Figure 5:
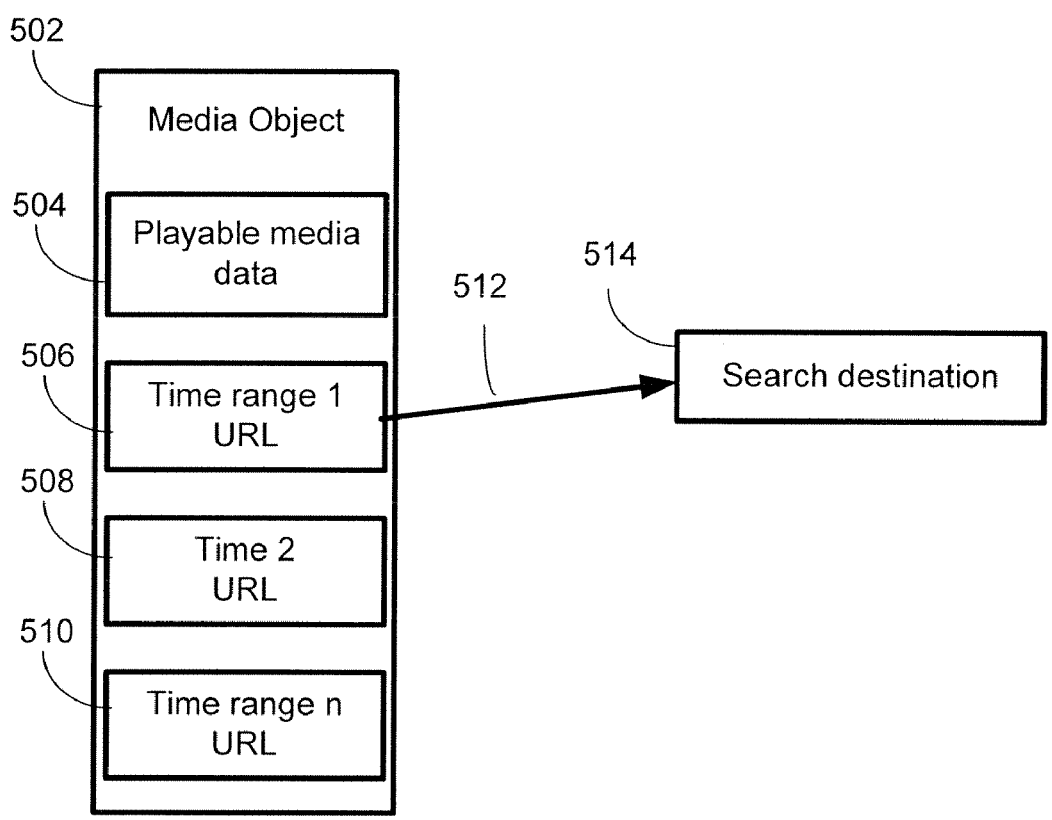
FIG. 5 is a block diagram of another alternate configuration of media object and media object metadata relationships.

FIG. 5 illustrates another embodiment using metadata 506 508 510 embedded directly in a media object 502 also having playable media data 504. In this exemplary embodiment, the metadata is a series of URLs, each associated with a different time range. As opposed to FIG. 4, where the metadata was used to develop search criteria, here the URL is used over link 512 to immediately access a destination 514 pointed to by the URL.

Figure 6:
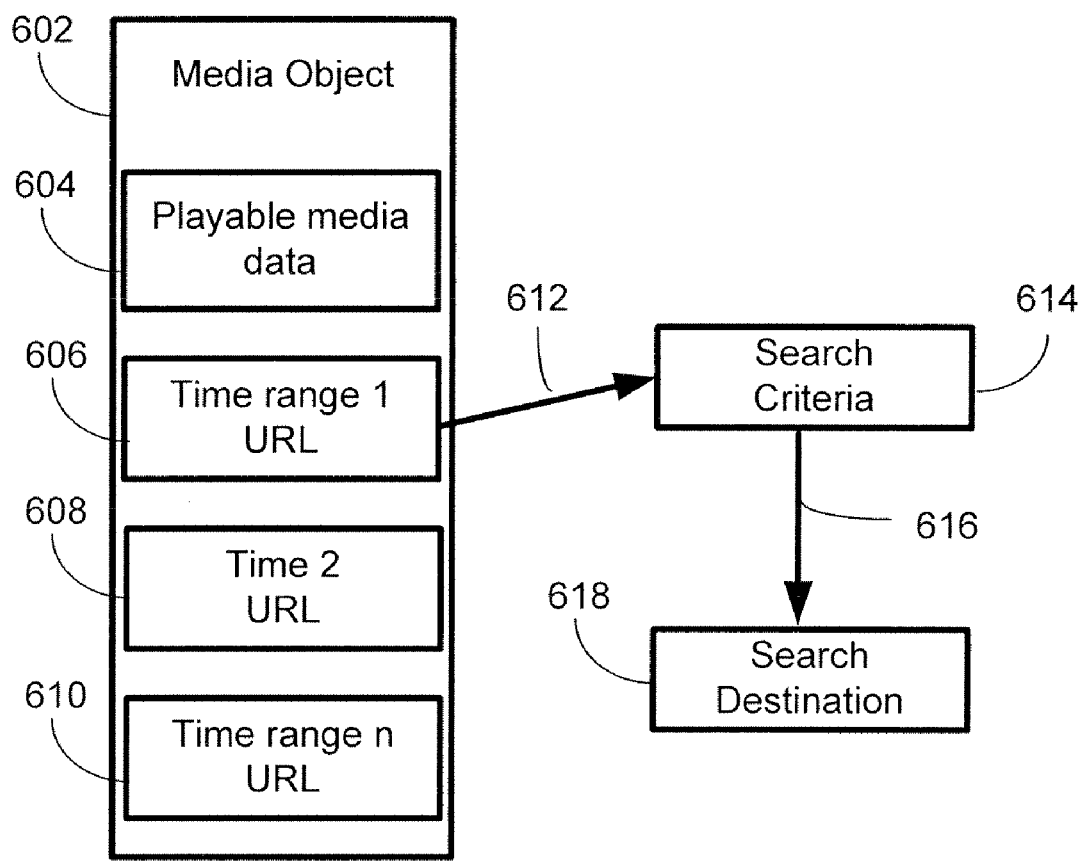
FIG. 6 is a block diagram of still another alternate configuration of media object and media object metadata relationships.

FIG. 6 illustrates yet another embodiment of 'earmarking' in a media object. The media object 602 may include both playable media data 604 and a set of metadata 606 608 610 each having one or more URLs and indexed by a time or time range. The link 612 may support access of a destination URL that is not an 'endpoint' for data, as in FIG. 5, but is rather a storage location for search criteria 614, such as keywords and URLs related to the mark object, as discussed above. The search criteria 614 may then use link 616 to access destination information 618. While this approach requires more network 'hops' than other embodiments, such as shown in FIGS. 4 or 5, the use of an intermediary for gathering search criteria 614 allows for the latest information to be referenced and continuously supplemented.

The use of mark objects to create search criteria targeting time-oriented elements of a media object greatly expand the amount of information available to a consumer of media without burdening the media producer with changes to media data formats or media storage capability. However, as more data storage space becomes available through technologies such as Blu-ray, the ability to add items of interest will become more commonplace. Earmarking provides a useful way to make such additional data available to both current and future media object consumers. The techniques described above allow backward compatibility to 'small media' such as CDs using external metadata and forward compatibility with more dense storage media incorporating integral time-organized data.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

We claim:

1. A computer-readable memory storing computer-executable instructions that, when executed, cause a computing device to perform a method comprising:
    receiving input from a user at a particular playback time of a media object being played on a media player;
    creating a mark object associated with the media object during playback of the media object, the mark object including:
        a media object identifier of the media object;
        a time marker corresponding to the particular playback time of the media object; and
        metadata extracted from the media object;
    storing the mark object at the media player;
    causing a remote storage location to be searched using the mark object and based on the media object and the particular playback time of the media object;
    receiving, from the remote storage location, data references associated with the media object and the particular playback time of the media object, the data references including search criteria used to initiate web searches for additional data about the media object, the search criteria being related to elements in a particular scene of the media object at the particular playback time;
    storing the search criteria as locally available media object metadata associated with the media object, the locally available media object metadata organized by time range;
    launching one or more web searches for the additional data about the media object during the playback of the media object using the search criteria;
    receiving results from the one or more web searches during the playback of the media object;
    adding the results to the locally available media object metadata; and
    supplementing the mark object with the locally available media object metadata.

2. The computer-readable memory of claim 1, wherein the method further comprises downloading the mark object to an electronic device.

3. The computer-readable memory of claim 1, wherein: the media object comprises the media object identifier, and creating the mark object comprises extracting the media object identifier from the media object.

4. The computer-readable memory of claim 1, wherein: the media object comprises a universal resource locator (URL), creating the mark object comprises extracting the URL from the media object, and executing the search of the remote storage location comprises accessing a site referenced by the URL.

5. The computer-readable memory of claim 1, wherein the metadata extracted from the media object includes a title and a publisher reference.

6. The computer-readable memory of claim 1, wherein the search criteria includes search key metadata and one or more time range-specific URLs.

7. The computer-readable memory of claim 6, wherein the mark object includes executable code for presenting a user with media object-related search options associated with performing an external search using the mark object, the search options allowing the user to search using keywords from the search key metadata, select from a list of the URLs, and view the locally available media object metadata before performing the external search.

8. The computer-readable memory of claim 1, wherein the method further comprises selecting time-specific media object metadata based on a time range corresponding to the time marker from the locally available media object metadata associated with the media object.

9. The computer-readable memory of claim 1, wherein: the media player displays a cursor-oriented user interface, and the input from the user comprises a cursor click that indicates a location of 5 an element being displayed in the particular scene at the particular playback time of the media object.

10. The computer-readable memory of claim 1, wherein the method further comprises accessing the mark object and displaying the results after the playback of the media object is complete.

11. A method comprising:
    receiving input from a user at a particular playback time of a media object being played on a media player;
    creating a mark object associated with the media object during playback of the media object, the mark object including a media object identifier of the media object and a time marker corresponding to the particular playback time of the media object;
    causing a remote storage location to be searched using the mark object and based on the media object and the particular playback time of the media object;
    receiving, from the remote storage location, data references associated with the media object and the particular playback time of the media object, the data references including search criteria used to initiate web searches for additional data about the media object, the search criteria related to elements in a particular scene of the media object at the particular playback time;
    storing the search criteria as locally available media object metadata associated with the media object, the locally available media object metadata organized by time range;
    launching one or more web searches for the additional information about the media object during the playback of the media object using the search criteria;
    receiving results from the one or more web searches during the playback of the media object;
    adding the results to the locally available media object metadata;
    supplementing the mark object with the locally available media object metadata; and
    presenting media object-related search options associated with performing an external search using the mark object, the search options enabling a user to search using keywords from the search criteria and to view the locally available media object metadata.

12. The method of claim 11, wherein the elements in the particular scene of the media object at the particular playback time include a product being used by an actor.

13. The method of claim 12, wherein the search criteria comprises at least one of a URL of a product page, a product identifier, and a product brand name.

14. The method of claim 11, wherein:
the media player displays a cursor-oriented user interface, and
the input from the user comprises a cursor click that indicates a location of an element being displayed in the particular scene at the particular playback time of the media object.

15. The method of claim 11, wherein the time marker corresponding to the particular playback time of the media object comprises one of a cumulative time from the media object start, a frame identifier, a media stream time identifier, a media stream packet identifier, and a time range identifier.

16. The method of claim 11, further comprising downloading the mark object from a computer incorporating the media player to a portable media player device.

17. A computing device comprising:
a processor for executing computer-executable instructions; and
memory storing computer-executable instructions for performing a method comprising:
receiving input from a user at a particular playback time of a media object being played on a media player;
creating a mark object associated with the media object during playback of the media object, the mark object including a media object identifier of the media object and a time marker corresponding to the particular playback time of the media object;
causing a remote storage location to be searched using the mark object and based on the media object and the particular playback time of the media object;
receiving, from the remote storage location, data references associated with the media object and the particular playback time of the media object, the data references including search criteria used to initiate web searches for additional data about the media object, the search criteria related to elements in a particular scene of the media object at the particular playback time;
storing the search criteria as locally available media object metadata associated with the media object, the locally available media object metadata organized by time range;
launching one or more web searches for the additional information about the media object during the playback of the media object using the search criteria;
receiving results from the one or more web searches during the playback of the media object;
adding the results to the locally available media object metadata;
supplementing the mark object with the locally available media object metadata; and
presenting media object-related search options associated with performing an external search using the mark object, the search options enabling a user to search using keywords from the search criteria and to view the locally available media object metadata.

* * * * *